No. 661,572. Patented Nov. 13, 1900.
D. BEEMER.
AIR BRAKE MECHANISM FOR CARS.
(Application filed Feb. 25, 1898. Renewed Apr. 30, 1900.)
(No Model.) 3 Sheets—Sheet 2.
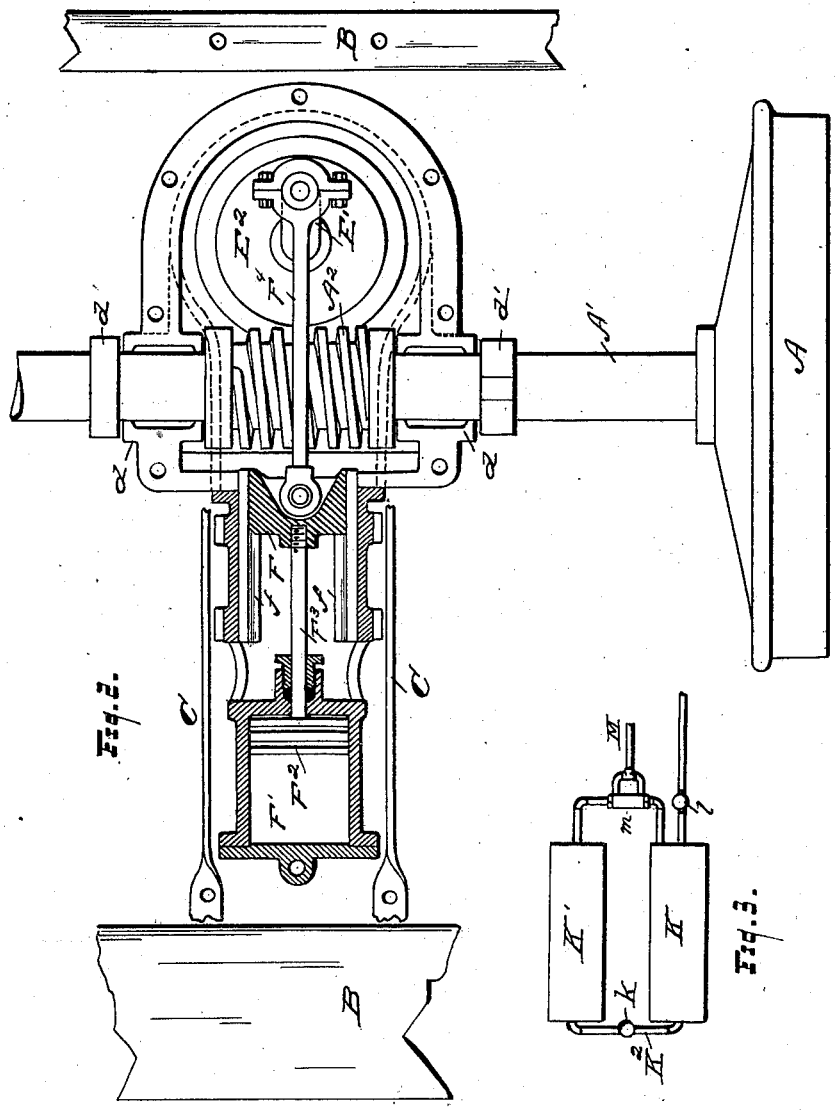
WITNESSES
M. E. Thomas
Ned Upham
INVENTOR
Dennis Beemer
By Fiok & Thomas
Attorneys

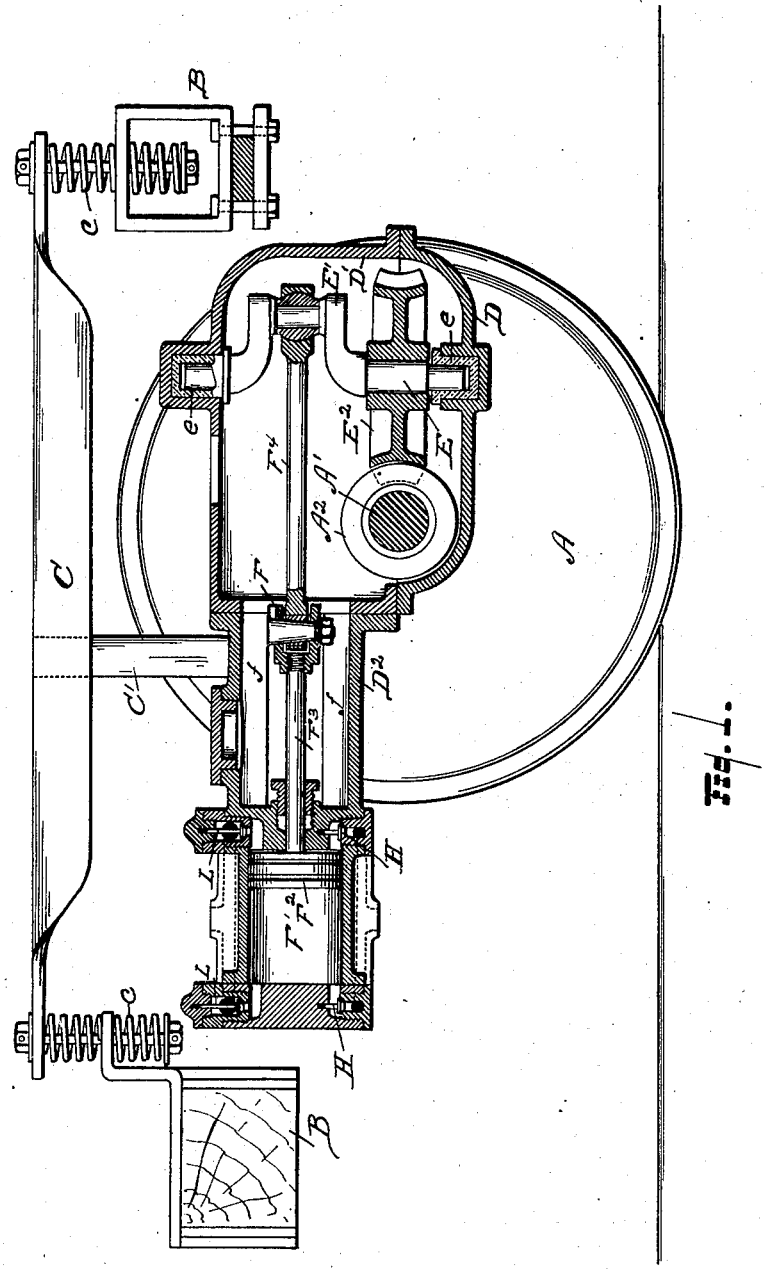

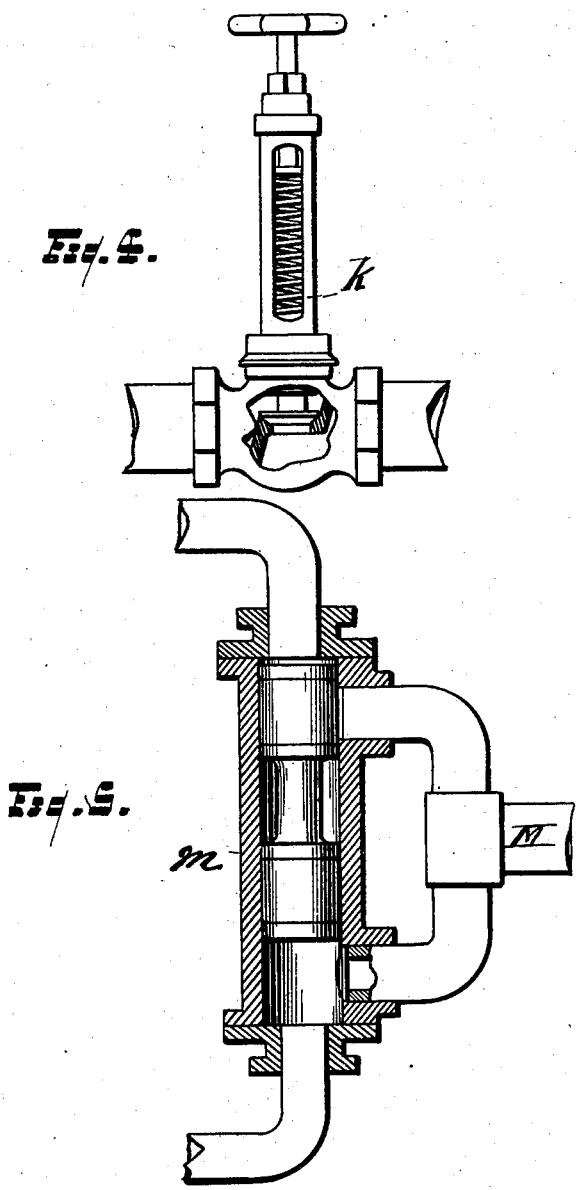

UNITED STATES PATENT OFFICE.

DENNIS BEEMER, OF DETROIT, MICHIGAN.

AIR-BRAKE MECHANISM FOR CARS.

SPECIFICATION forming part of Letters Patent No. 661,572, dated November 13, 1900.

Application filed February 25, 1898. Renewed April 30, 1900. Serial No. 14,916. (No model.)

*To all whom it may concern:*

Be it known that I, DENNIS BEEMER, a citizen of the United States, residing at Detroit, county of Wayne, State of Michigan, have invented a certain new and useful Improvement in Air-Brake Mechanism for Cars; and I declare the following to be a full, clear, and exact description of the invention, such as will enable others skilled in the art to which it pertains to make and use the same, reference being had to the accompanying drawings, which form a part of this specification.

My invention relates to improvements in air-brake mechanism for cars; and it consists in improved means for operating the compression-pump from the axle of the car.

My invention is shown in the accompanying drawings, in which—

Figure 1 is a vertical section; Fig. 2, a horizontal section; Fig. 3, a view showing the storage-tanks and means for admitting air from the pump to the tanks. Fig. 4 is a side elevation, partly in section, of the valve $k$. Fig. 5 is a view of the balance-valve $m$.

In the drawings, A represents a wheel of a car, and A' the axle.

B represents portions of the truck-frame, on which the longitudinal beams C are supported. To allow the beams to move vertically with the axle of the car, springs $c\ c$ are interposed between the frames and the beams.

C' C' are hangers on which the device is suspended from the beams C C. The running parts of the device are inclosed and have their bearing in a dust-proof case consisting of the sections D, D', and $D^2$, the latter forming the pump-cylinder and bearing for the sliding head. The line of separation between sections D and D' of the case is in the same plane as the axle of the car, and the case is mounted on the axle on dust-proof bearings $d\ d$, formed in the portions D and D' of the case. The case is held against lateral movement on the axle by the collars $d'\ d'$.

Within the case and fixed to the axle is the worm $A^2$. Mounted in the frame and at right angles to the worm is the shaft E, provided with the crank E'. The shaft E has its bearings in the bushings or journal-boxes $e\ e$, that are supported in recesses in the inner walls of the case.

$E^2$ is a worm-wheel mounted on the shaft E. This worm-wheel meshes with the worm $A^2$ and rotates the shaft E and crank E' from the axle A'.

F is a sliding head that moves on ways $f\ f$, formed on the interior of the portion $D^2$ of the case.

F' is the pump-cylinder, $F^2$ the piston, and $F^3$ the connecting-rod between the sliding head and piston. Suitable means is provided for packing the piston-rod. $F^4$ is the crank-rod connecting the sliding head and the crank E'.

The pump is double-acting and is provided with the inlet-valves H H and outlet-valves L L. The inlet-ports are preferably connected with a single intake-pipe having its inlet end located a sufficient distance above the track, preferably inside the car, to avoid taking in dust with the air. The outlet-ports lead to a single discharge-pipe, that in turn leads to the storage-tanks K and K'. The discharge-pipe is provided with the check-valve $l$ and beyond the valve discharges into tank K.

$K^2$ is a pipe leading to tank K' and is provided with a loaded valve $k$. This valve only passes air to tank K' when the pressure in tank K reaches a predetermined pressure, after which tank K' takes the air until the pressure in it reaches that in tank K or until the air in that tank has been exhausted below the pressure necessary to open the valve $k$.

M is the pipe leading from the tanks to the brake mechanism and is drawn off through the balance-valve $m$. Any form of valve may be used here that will pass the air to pipe M from the tank under the highest pressure.

The form of gearing herein shown accomplishes two much-desired results. It provides for moving the crank-rod in a horizontal plane, thereby reducing the amount of room taken under the car and provides for reducing the speed of the pump to any desired action. In the machines heretofore manufactured the speed is reduced as one to twenty-one, and such reduction has proven satisfactory. As such reduction is inconvenient if not impossible with spur-gears the advantage of the form herein shown is evident.

What I claim is—

1. The combination of the axle, the vertical crank-shaft, gear connecting the axle and crank-shaft, and the pump, substantially as described.

2. The combination of the axle, the worm-gear, the vertical crank-shaft and the pump, substantially as described.

3. The combination of the axle, the case divided horizontally on a line with the axle, the crank-shaft and gear and the interior bearings for the crank-shaft formed in the opposite portions of the case, said bearings adapted to assemble with and support the shaft when the case is united over the axle, substantially as described.

4. The combination of the axle, the pump the connecting-rod, the gear operated from the axle and a crank operated by said gear for oscillating and reciprocating the connecting-rod in a horizontal plane, substantially as described.

In testimony whereof I sign this specification in the presence of two witnesses.

DENNIS BEEMER.

Witnesses:
S. E. THOMAS,
C. H. FISK.